April 17, 1956     J. J. MAGILL     2,741,863
TROLLING PLANER
Filed Sept. 19, 1955     2 Sheets-Sheet 1
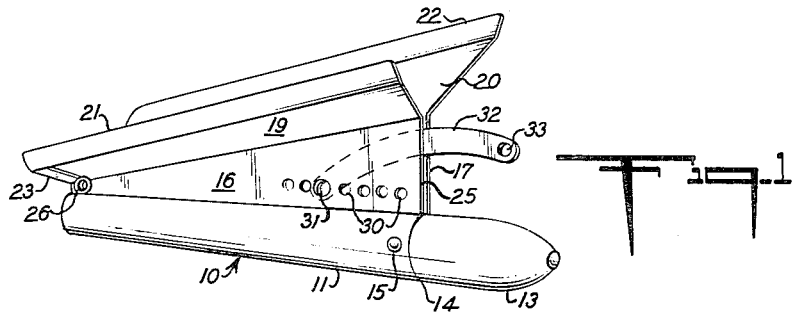
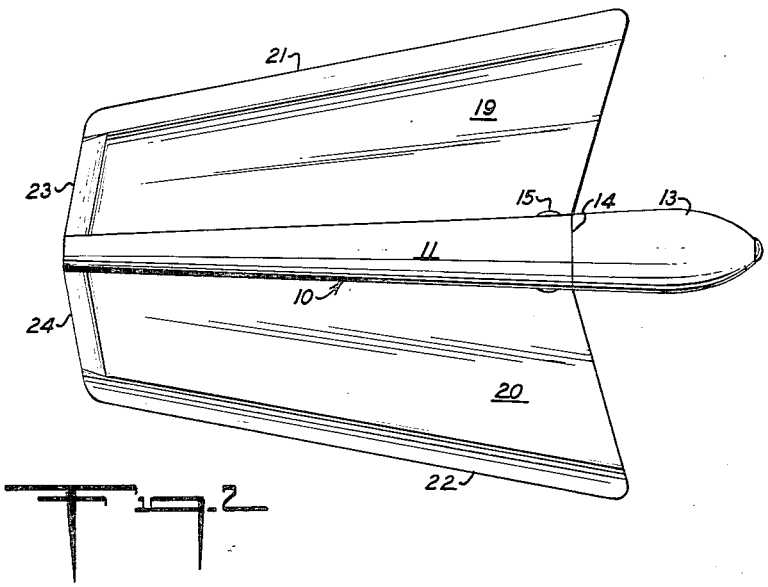
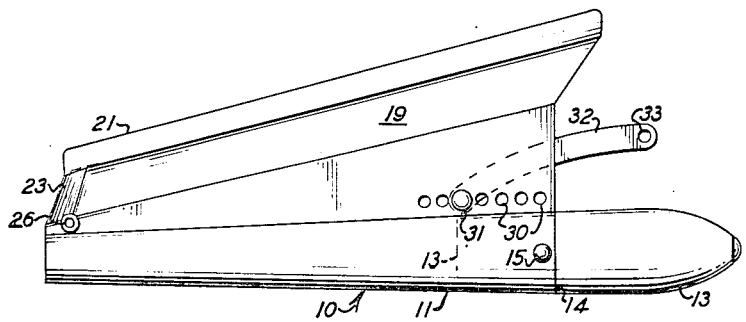
INVENTOR
JOSEPH J. MAGILL
BY *Herbert J. Jacobi*
ATTORNEY April 17, 1956  J. J. MAGILL  2,741,863
TROLLING PLANER
Filed Sept. 19, 1955  2 Sheets-Sheet 2
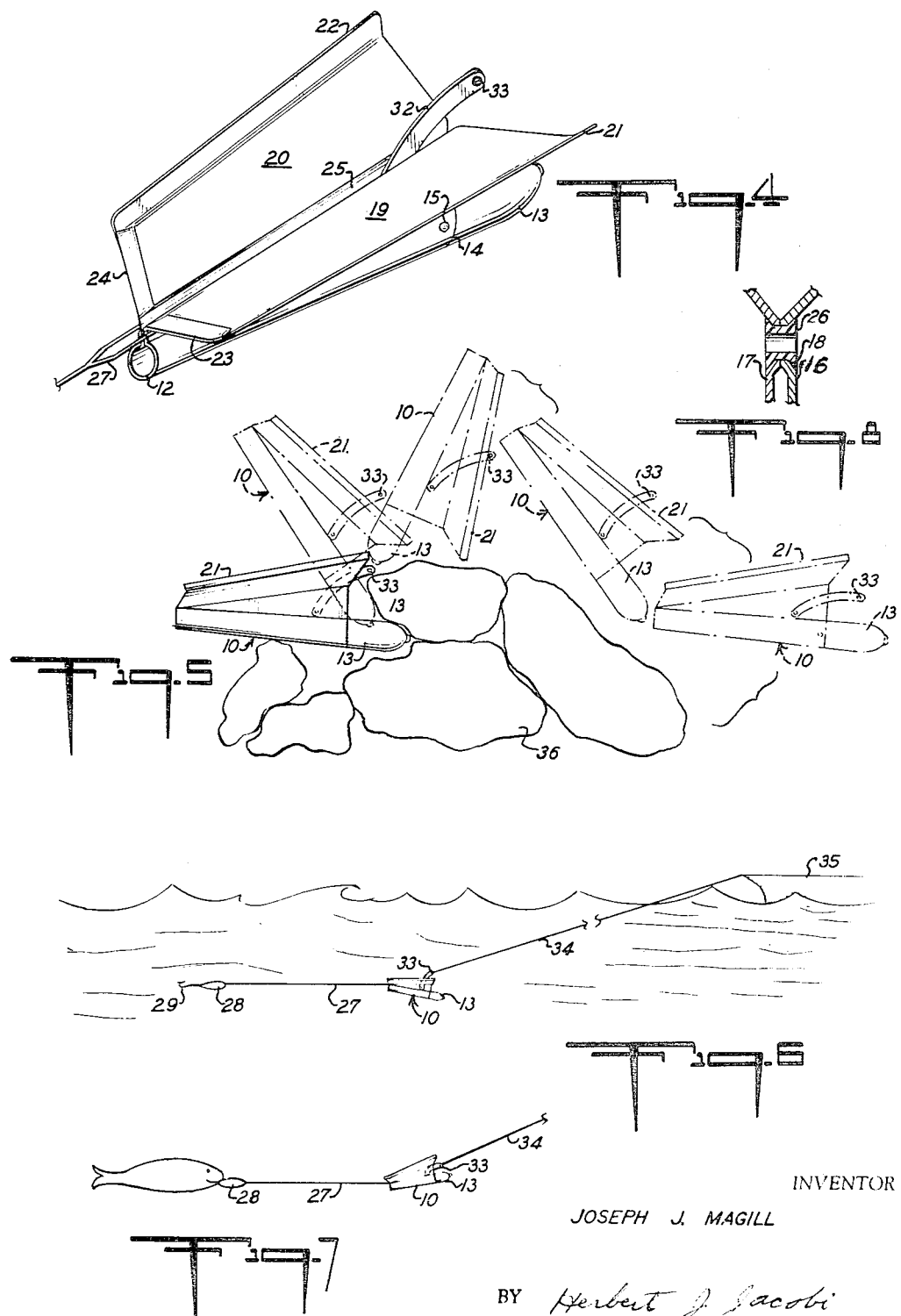
INVENTOR
JOSEPH J. MAGILL
BY Herbert J. Jacobi
ATTORNEY United States Patent Office 2,741,863
Patented Apr. 17, 1956

2,741,863

TROLLING PLANER

Joseph John Magill, Brielle, N. J., assignor to Art Wire and Stamping Company, Newark, N. J., a corporation of New Jersey Application September 19, 1955, Serial No. 534,944

8 Claims. (Cl. 43—43.13)

This invention relates to fishing tackle and more particularly to a trolling planer for selectively controlling the depth of a fish lure or other bait while trolling for fish from a boat moving through the water at any desired speed.

As is well known, various types of fish are found at different depths and also, the depth at which it is desired to troll may be determined by weather or water conditions and also by the nature of the bottom over which such trolling is taking place. In locations where there are relatively strong tides or currents or where it is necessary for some reason for the boat to move at a relatively fast speed, and also in cases where it is desired to troll at a relatively great depth, it has heretofore been necessary to utilize a relatively heavy sinker or weight to maintain the fish lure or other bait at the desired depth. Such a sinker or weight adds materially to the difficulty of handling the fishing tackle, particularly when it is necessary to frequently pull the same into the boat and furthermore, if for any reason the boat is stopped, such a sinker and the line and lure attached thereto will immediately go to the bottom and frequently become entangled in rocks or other obstacles. Also such weights or sinkers are relatively costly and are frequently lost, for the reasons mentioned above, which not only necessitates replacing such weight or sinker, but also results in a material loss of fishing time.

Heretofore, various types of planers or depth control devices for trolling lines have been proposed and utilized, but many of these were unstable during movement through the water and could not be adequately controlled, either as to depth or direction of movement and furthermore, if a fish were momentarily hooked and subsequently lost, the planer would immediately rise to the surface requiring hauling into the boat and resetting prior to continuing fishing operations. Furthermore, many of these prior art planers provided no means for permitting release of the same upon becoming entangled or caught in a submerged object and consequently, such planers were frequently lost. A further disadvantage of these prior art planers was the fact that due to the instability thereof, it was often impossible to utilize more than one planer at a time from the same boat, since, if more than one planer were used, the lines attached thereto frequently became entangled thereby requiring considerable time and patience on the part of the fisherman in straightening the same out and resuming fishing operations.

It is accordingly an object of the invention to provide a trolling planer which may be conveniently manufactured from readily available material and at a relatively low cost, which planer may be of exceptionally rugged construction thereby preventing damage thereto during normal handling and fishing operations.

A further object of the invention is the provision of a trolling planer incorporating stabilizing means to maintain the same at a constant depth and also to provide substantially straight movement through the water.

A still further object of the invention is the provision of a trolling planer which may be preset to operate at any desired depth, regardless of water, current, tide conditions or boat speeds.

Another object of the invention is the provision of a trolling planer which will automatically operate to dislodge itself from a submerged object.

A further object of the invention is the provision of a trolling planer which after moving toward the surface as the result of hooking a fish, will automatically return to trolling depth upon loosing such fish.

A still further object of the invention is the provision of a trolling planer which requires no adjustments or skill in operation, other than presetting the desired trolling depth, it thereafter only being necessary to deposit the planer in the water and pay out the desired length of line.

Further objects and advantages of the invention will be apparent from the following description taken in conjunction with the accompanying drawing wherein:

Fig. 1 is a view in perspective taken from the front and side of a trolling planer constructed in accordance with this invention;

Fig. 2 a bottom plan view of the fishing planer shown in Fig. 1;

Fig. 3 a side elevational view of the trolling planer and showing the inclination of the vanes relative to the longitudinal axis of the keel;

Fig. 4 a view in perspective taken from the rear upper side of the trolling planer of this invention;

Fig. 5 an elevational view showing in solid lines a trolling planer constructed in accordance with this invention and lodged in an underwater obstruction and further showing in dotted lines, the operation of the planer to automatically free itself from such obstruction;

Fig. 6 a diagrammatic view showing a trolling planer constructed in accordance with this invention during normal operation thereof;

Fig. 7 a view similar to Fig. 6 and showing the operation of the planer after hooking a fish; and Fig. 8 a fragmentary sectional view showing the manner of installation of the eyelet for securing the plates together and for attaching a line to the planer.

With continued reference to the drawing there is shown a trolling planer constructed in accordance with this invention and which may well comprise a one-piece body 10 formed of suitable sheet material, such as stainless steel, plastics or any other desired material which may be suitably formed or molded to the desired shape. The body 10 is formed to provide an elongated hollow keel 11 open at the rear end thereof, as shown at 12, in Fig. 4 and having a balance weight 13 of lead or other suitable material, the weight thereof being predetermined in accordance wtih the size of the planer. The balance weight 13 is secured in the forward end 14 of the keel 15 by a rivet 15 or other suitable fastening means extending therethrough. It is to be noted, that the keel 11 is substantially circular in cross section at the forward end 14 and that the same tapers to a round cross section, at the rear end 12. This in conjunction with the generally pointed shape of the balance weight 13 provides a streamlined keel which permits substantially free movement of the planer through the water thereby preventing undue turbulence and also reducing the strain on the fishing line attached to the planer and leading to the boat carrying the fishermen.

The sheet material forming the keel 11 extends upwardly from the upper side thereof, in the form of spaced substantially parallel plates 16 and 17, to provide a longitudinally extending vertical fin. The plate 16 terminates at its upper edge in an inwardly and laterally extending vane 19 and, in a similar manner, the plate 17 terminates at its upper edge in an upwardly and laterally extending vane 20. As will be seen from an inspection of Figs. 1 and 3, vanes 19 and 20 are inclined upwardly, with respect to the longitudinal axis of the keel 11 from the rear end 12 to the front end 14. The vane 19 terminates at its outer edge in an upwardly and outwardly disposed flange 21 and the vane 20 terminates at its outer edge in an upwardly and outwardly disposed flange 22. Flanges 21 and 22 are relatively narrow and, as clearly seen in Figs. 2 and 4, these flanges converge from the front to the rear of the vanes 19 and 20. The rear edge of the vane 19 is bent downwardly to provide a laterally disposed relatively narrow diving fin 23 and in a similar manner, the rear edge of the vane 20 is bent downwardly to provide a laterally disposed diving fin 24. It is to be noted, that the space or slot 25 between the plates 16 and 17 is open at the upper edge thereof between the vanes 19 and 20 and communicates with the hollow keel 11 for a purpose to be later described.

As will be seen from an inspection of Fig. 8, each plate 16 and 17 is provided with an indentation 18 adjacent the rear edge thereof and an eyelet 26 extends through the plates and is beaded over into the indentations 18 to secure the plates 16 and 17 together. The eyelet may be formed of nylon, metal or any other suitable material to facilitate attaching a line 27 or a swivel, not shown, to which may be attached a suitable fish lure or other bait 28 carrying a hook 29. A plurality of longitudinally spaced apertures 30 extend through the plates 16 and 17 adjacent the forward end thereof and these apertures 30 serve to selectively receive a pin, bolt or other suitable fastening means 31 extending through one end of a flat link 32 disposed in the space 25 between the plates 17 and 16 and pivotally mounted therein by means of the pin or other fastening means 31 extending through a selected aperture 30. The opposite end of the link 32 may be provided with an aperture 33 or other suitable means for facilitating the attachment of a line 34 thereto and, as shown in Fig. 6, such line may lead from the planer to a boat 35.

The depth at which the planer of this invention will operate is determined by the selected aperture 30 in which the pin or other fastening means 31 is disposed with the depth becoming greater as the pin 31 is moved rearwardly of the planer. In normal operation, the pin 31 is placed in the selected aperture 30 and the planer with the line 27 and lure or other bait 28 connected thereto, by means of the eyelet 26, is dropped overboard and the line 34 payed out to the desired length. As the boat 35 moves through the water, the planer is towed behind the same, by means of the line 34 and the flow of water against the lower surfaces of the diving fins 23 and 24 will tend to elevate the rear ends of the vanes 19 and 20 and also due to the weight 13 disposed at the forward end of the planer, the same will move downwardly in the water until it reaches the depth determined by the position of the pin 31. At this point, equilibrium between the tendency of the planer to move downwardly in the water and the upward pull of the line 34 will be reached and thereafter, the planer will move through the water at a uniform depth and also in a substantially straight line. The straight line movement of the planer through the water is determined by the vertical fin formed by the plates 16 and 17 and, of course, if desired, such fin may be bent to cause the planer to move laterally in either direction, but in normal use, such fin would be straight and the planer would move in a straight line through the water. The stability of the planer is further enhanced by the flow of water through the space or slot 25 between the plates 16 and 17 and into the keel 11 from which the water flows outwardly through the rear end 12 thereof. The converging relationship of flanges 21 and 22, as well as the downward and inward inclination of the vanes 19 and 20, serves to direct the water into the slot or space 25 and as a result, the planer of this invention is extremely stable in its movements through the water.

The planer will continue in this manner at a predetermined depth until such time as a fish is hooked and as a result thereof, the rear end 12 of the planer will be pulled downwardly, thereby changing the angle of attack of the vanes 19 and 20 from either a negative or zero angle, as shown in Fig. 6, to a positive angle as shown in Fig. 7. This will result in the planer moving toward the surface of the water and if the fish remains hooked, the planer will surface in a relatively short time. However, in the event the fish is lost, the planer will then automatically dive to the predetermined trolling depth and maintain such depth until another fish is hooked. This results in providing an automatic reset feature for the planer of this invention and precludes the necessity for hauling the planer into the boat after a fish has been hooked and lost, in order to reset the planer for further trolling operations. This surfacing operation of the planer also materially assists in landing the fish, since the upward movement of the planer is added to the pull on the line 34 by the fisherman hauling in the planer and fish.

In certain localities, the planer of this invention may become lodged in rocks 36 or other underwater obstructions as shown in Fig. 5, and in order that the same will operate to automatically dislodge itself, as shown in Fig. 5, by reason of the fact that if the nose of the weight 13 becomes lodged beneath a rock or other obstruction 36, the planer will pivot about the nose of the weight 13, by reason of the fact, that link 32 is pivotally mounted and will exert a pull to the rear of the nose of the weight 13 thereby pivoting the entire planer about such nose and permitting withdrawal of the same from the rock or other obstruction 36. Upon dislodgement from such obstruction, the planer will then automatically reset and move to the predetermined trolling depth. It is also to be noted, that the link 32 is curved, as clearly shown in Figs. 1, 3 and 4, and this curvature is provided for the purpose of maintaining the pull on the line 34 through the planer to a fish on the hook 29 or to the lure 28 in a substantially straight line. This further results in stability of the planer.

It will be obvious that by the above described invention, there has been provided a relatively simple, yet highly efficient trolling planer and one which may be economically manufactured from readily available materials and providing sufficient strength and rigidity to prevent damage in any normal use or handling thereof. Furthermore, the planer of this invention may be made in any desired sizes, depending upon the depth and type of fish to be caught and also, due to the inherent stability thereof, a plurality of such planers may be advantageously utilized from the same boat. Furthermore, the structure of this planer permits automatic dislodgement from underwater obstructions and also permits automatic resetting and returning to trolling depth after departure from such depth due to any reason.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A trolling planer comprising a one-piece body of sheet material formed to provide an elongated hollow keel open at the rear end and having a balance weight secured in the forward end and closing the same, said keel being substantially circular in cross section at the forward end and tapering to a round cross section at the rear end, the sheet material forming said keel extending upwardly from the upper side of said keel in the form of spaced substantially parallel plates to provide a longitudinally extending vertical fin structure, said plates terminating at the upper edges in upwardly and laterally extending vanes, said vanes having a major planar portion being inclined upwardly with respect to the longitudinal axis of said keel from the rear end to the forward end of said vanes, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, an eyelet in said vertical fin structure adjacent the rear end thereof to facilitate attachment of a fish lure, said vertical fin structure having a plurality of longitudinally spaced apertures adjacent the forward end thereof, a curved flat link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link said diving fins and said weight will cause said planer to dive to and thereafter maintain a selected depth determined by the selected aperture and said flanges and vanes will cause a flow of water through said space into said keel and out of the rear end thereof to assist in maintaining the stability of said planer.

2. A trolling planer comprising a one-piece body of sheet material formed to provide an elongated hollow keel open at the rear end and having a balance weight secured in the forward end and closing the same, said keel being substantially circular in cross section at the forward end and tapering to a round cross section at the rear end, the sheet material forming said keel extending upwardly from the upper side of said keel in the form of spaced substantially parallel plates to provide a longitudinally extending vertical fin structure, said plates terminating at their upper edges in upwardly and laterally extending vanes, said vanes having a major planar portion being inclined upwardly with respect to the longitudinal axis of said keel from the rear end to the forward end of said vanes, said vanes terminating at the outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinal spaced apertures adjacent the forward end thereof, a flat link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link said diving fins and said weight will cause said planer to dive to and thereafter maintain a selected depth determined by the selected aperture and said flanges and vanes will cause a flow of water through said space into said keel and out of the rear end thereof to assist in maintaining the stability of said planer.

3. A trolling planer comprising a one-piece body of sheet material formed to provide an elongated hollow keel open at the rear end and having a balance weight secured in the forward end and closing the same, said keel tapering from the forward end to the rear end, the sheet material forming said keel extending upwardly from the upper side of said keel in the form of spaced substantially parallel plates to provide a longitudinally extending vertical fin structure, said plates terminating at their upper edges in upwardly and laterally extending vanes, said vanes having a major planar portion being inclined upwardly with respect to the longitudinal axis of said keel from the rear end to the forward end of said vanes, said vanes terminating at the outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinally spaced apertures adjacent the forward end thereof, a link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link said diving fins and said weight will cause said planer to dive to and thereafter maintain a selected depth determined by the selected aperture and said flanges and vanes will cause a flow of water through said space into said keel and out of the rear end thereof to assist in maintaining the stability of said planer.

4. A trolling planer comprising a body of sheet material formed to provide an elongated hollow keel open at the rear end and having a balance weight secured in the forward end and closing the same, said keel tapering from the forward end to the rear end, the sheet material forming said keel extending upwardly from the upper side of said keel in the form of spaced substantially parallel plates to provide a longitudinally extending vertical fin structure, said plates terminating at their upper edges in upwardly and laterally extending vanes, said vanes having a major planar portion being inclined upwardly with respect to the longitudinal axis of said keel from the rear end of said vanes to the forward end, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a flash lure, said vertical fin structure having a plurality of longitudinally spaced apertures adjacent the forward end thereof, a link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link, said diving fins and said weight will cause said planer to dive to and thereafter maintain a selected depth determined by the selected aperture and said flanges and vanes will cause a flow of water through said space into said keel and out of the rear end thereof to assist in maintaining the stability of said planer.

5. A trolling planer comprising a body of sheet material formed to provide an elongated hollow keel open at the rear end and having a balance weight secured at the forward end, said keel tapering from the forward end to the rear end, the sheet material forming said keel extending upwardly from the upper side of said keel in the form of spaced substantially parallel plates to provide a longitudinally extending vertical fin structure, said plates terminating at their upper edges in upwardly and laterally extending vanes, said vanes having a major planar portion being inclined upwardly with respect to the longitudinal axis of said keel from the rear end to the forward end of said vanes, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinally spaced structures adjacent the forward end thereof, a link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link said diving fins and said weight will cause said planer to dive to and thereafter maintain a selected depth determined by the selected aperture and said flanges and vanes will cause a flow of water through said space into said keel and out of the rear end thereof to assist in maintaining the stability of said planer.

6. A trolling planer comprising a body formed to provide an enlongated hollow keel open at the rear end and having a balance weight secured at the forward end, said keel tapering from the forward end to the rear end, spaced substantially parallel plates extending upwardly from the upper side of said keel to provide a longitudinally extending vertical fin structure, said plates terminating at their upper edges in upwardly and laterally extending vanes, said vanes having a major planar portion being inclined upwardly with respect to the longitudinal axis of said keel from the rear end to the forward end of said vanes, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinally spaced apertures adjacent the forward end thereof, a link disposed between said plates and pivotally secured at one end to said vertical fin structure by fastening means selectively disposed in one of said apertures and means at the opposite end of said link to facilitate attachment of a line thereto, the space between said plates being open at the top between said vanes and communicating with the interior of said keel whereby upon towing said planer through the water by a line attached to said link said diving fins and said weight will cause said planer to dive to and thereafter maintain a selected depth determined by the selected aperture, the flow of water through said space into said keel and out of the rear end thereof serving to assist in maintaining the stability of said planer.

7. A trolling planer comprising a body formed to provide an elongated hollow keel open at the rear end and having a balance weight secured at the forward end, said keel tapering from the forward end to the rear end, a longitudinally extending vertical fin structure on the upper side of said keel, upwardly and laterally extending vanes on the upper edge of said fin structure, said vanes having a major planar portion being inclined upwardly with respect to the longitudinal axis of said keel from the rear end to the forward end, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinally spaced apertures adjacent the forward end thereof, a link pivotally secured at one end to said vertical fin structure by fastening means selectively disposed in one of said apertures and means at the opposite end of said link to facilitate attachment of a line thereto whereby upon towing said planer through the water by a line attached to said link said diving fins and said weight will cause said planer to dive to and thereafter maintain a selected depth determined by the selected aperture.

8. A trolling planer comprising a body formed to provide an elongated keel having a balance weight secured at the forward end, said keel tapering from the forward end to the rear end, a longitudinally extending vertical fin structure on the upper side of said keel, upwardly and laterally extending vanes on the upper edge of said fin structure, said vanes having a major planar portion being inclined upwardly with respect to the longitudinal axis of said keel from the rear end to the forward end, said vanes terminating at their outer edges in relatively narrow upwardly and outwardly disposed flanges, said flanges converging from the front to the rear of said vanes, the rear edges of said vanes being bent downwardly from the planar portion of each vane to provide laterally disposed diving fins, means in said vertical fin structure adjacent the rear end thereof to facilitate attachment of a fish lure, said vertical fin structure having a plurality of longitudinally spaced apertures adjacent the forward end thereof, a link pivotally secured at one end to said vertical fin structure by fastening means selectively disposed in one of said apertures and means at the opposite end of said link to facilitate attachment of a line thereto whereby upon towing said planer through the water by a line attached to said link said diving fins and said weight will cause said planer to dive to and thereafter maintain a selected depth determined by the selected aperture.

References Cited in the file of this patent

UNITED STATES PATENTS

| 1,408,001 | Houck | Feb. 28, 1922 |
| 2,648,929 | Dunn | Aug. 18, 1955 |

FOREIGN PATENTS

| 172,140 | Great Britain | Dec. 8, 1921 |